United States Patent [19]

Strödter

[11] Patent Number: 4,809,752

[45] Date of Patent: Mar. 7, 1989

[54] THREAD PROTECTOR FOR SCREW THREADS, MADE OF A DEFORMABLE MATERIAL WITH A COMPLEMENTARY THREAD

[75] Inventor: Wilhelm Strödter, Hamm, Fed. Rep. of Germany

[73] Assignee: Wilhelm Strödter Maschinen- und Apparatebau, Hamm, Fed. Rep. of Germany

[21] Appl. No.: 44,838

[22] Filed: Apr. 30, 1987

[30] Foreign Application Priority Data

May 2, 1986 [DE] Fed. Rep. of Germany ..... 36150037

[51] Int. Cl.$^4$ ............................................... B65D 59/06
[52] U.S. Cl. .................................................... 138/96 T
[58] Field of Search ............... 138/96 T; 411/412, 436

[56] References Cited

U.S. PATENT DOCUMENTS

| | | | |
|---|---|---|---|
| 1,211,477 | 1/1917 | Moore | 138/96 T |
| 2,225,754 | 12/1940 | Mirfield | 138/96 T |
| 2,385,408 | 9/1945 | Engstrom | 138/96 T |
| 2,878,905 | 3/1959 | Langermeier | 138/96 T |
| 3,074,579 | 1/1963 | Miller | 138/96 T |
| 4,020,873 | 5/1977 | Palarino | 138/96 T |
| 4,437,804 | 3/1984 | Fischer | 411/412 X |
| 4,655,256 | 4/1987 | Lasota et al. | 138/96 T |

Primary Examiner—William A. Cuchlinski, Jr.
Attorney, Agent, or Firm—Toren, McGeady & Associates

[57] ABSTRACT

A thread protector consists at least in part of shock-absorbing elastic material and has a complementary thread of which the root and/or flank face exhibits projections. A sealing face of the thread protector can also be provided with projections running around it. In this way easy screwing-on and/or centering of the thread protector is achieved, with better automatic locking against unintentional loosening of the thread protector, and non-uniform displacement of thread grease is avoided.

18 Claims, 3 Drawing Sheets

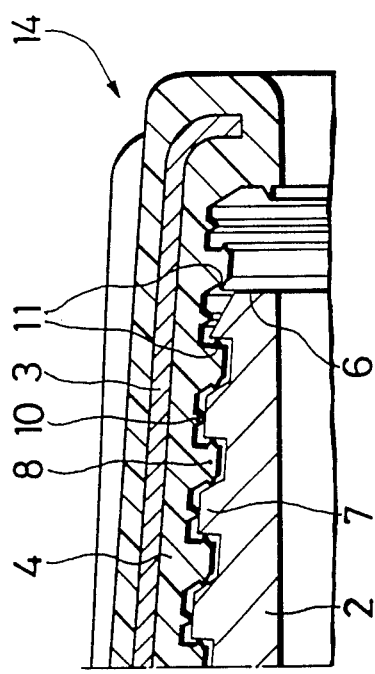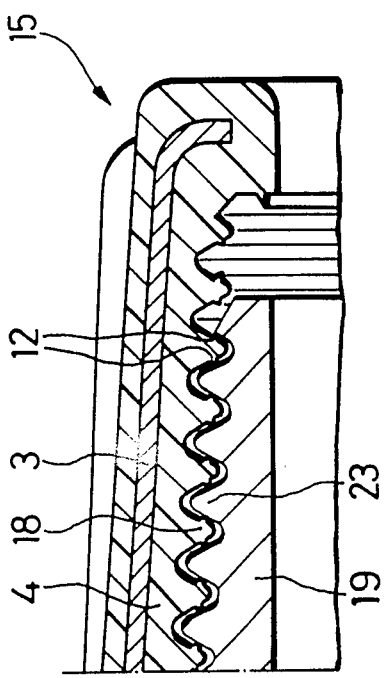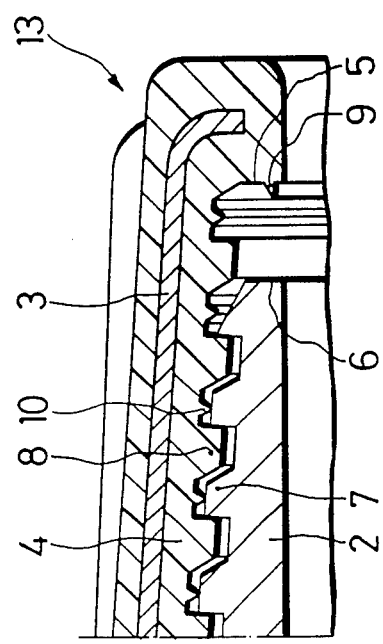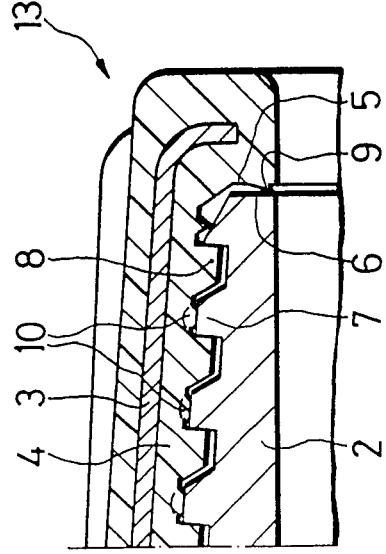

THREAD PROTECTOR FOR SCREW THREADS, MADE OF A DEFORMABLE MATERIAL WITH A COMPLEMENTARY THREAD

The invention relates to a thread protector for screw threads, made of deformable material and having a complementary thread, in particular for oilfield tubes.

Constructional parts are often provided in the maker's works with screw threads intended to be screwed up on site to give an exact fit without subsequent preparation. A typical example is provided by oilfield tubes which, provided in the works with gas-tight threads on their ends, are screwed together on the drilling platform and sunk into a drill hole. During transport, on handling and in storage the thread must be protected from mechanical and chemical attack until immediately before use on the drilling platform, as otherwise it cannot be screwed up or becomes leaky under pressure. For this purpose many different protective caps for external threads and protective nipples for internal threads have been developed.

A thread projector cap of this kind made of a stable steel body having a relatively soft, shock-absorbing coating and a thread complementary to the thread to be protected is described in German Offenlegungsschrift No. 28 00 747.

While the thread protector, owing to the casting of the coating in a precision mould, is always round, experience shows that large threads, particularly those of large diameter oilfield tubes, have ovalities of some tenths of a millimeter.

The elasticity of the known thread protector is however so slight that on screwing it on the ovality of the tube can only be overcome, if at all, by the use of great force. In the frequently used method of screwing on with constant maximum torque the thread protector is then not screwed on far enough for the sealing surface of the thread protector to abut against the end face of the tube. Corrosive media can penetrate into the resulting gap, and also the thread protector can rock about the axis of greatest ovality. On vibration this inevitably leads to the thread protector shaking loose, for example in transport of the tube.

If, in order to overcome the ovality, the diameter of the thread protector is made only slightly larger, there is then no automatic locking against shaking loose.

This problem also arises if the coating—usually of plastic material—that contracts more at low temperatures than the thread to be protected, so that the thread protector becomes loose on the tube threads.

Under the influence of heat the plastic expands more than the tube thread, and in some circumstances the thread can lock so tightly that the thread protector cannot be unscrewed.

It has also previously been proposed to employ stable hollow bodies having a shock-absorbing coating as thread protectors, or to make the thread protector of two plastic sheaths: these parts exhibit a non-complementary thread, so that they can be pressed on to the thread to be protected (German Gebrauchsmuster (utility model) 81 13 177, U.S. Pat. No. 4,020,873, U.S. Pat. No. 4,020,874) or can be easily screwed on and off as a result of shortening the crests of the threads (German Gebrauchsmuster No. 78 37 549). The disadvantage of this known thread protector is that on penetration of an aqueous electrolyte, for example salt water, the thread becomes corroded. Often this thread protector even loosens during transport. In addition the grease from the threads is stripped off from crests or flanks of the threads.

The object of the invention is therefore to provide a thread protector that can easily be screwed on and off despite ovalities in the thread to be protected, ensures reliable protection against mechanical and chemical attack, remains tight during transport and storage, however widely the temperature fluctuates, and does not strip off grease that has been applied to the threads.

This object is achieved according to the invention if the complementary thread of the thread protector, which preferably consists of an elastically deformable material, has at least one deformable projection for at least one pitch of the thread.

The sharper the projections, the more easily do they slip over the crests or flanks of the thread to be protected as the thread protector is screwed on. Friction is reduced to a minimum. The slip path of the projections is so narrow that the thread grease, which is nowadays usually applied as a very thin layer, is not forced out of the thread profile, as happens with the known thread protector.

In the middle of the thread protector the projections can be formed as knots or loops, forming one or two continuous ribs at least at the beginning and end of the thread in order to prevent the penetration of liquids, particularly salt water.

The tighter the thread protector is screwed on, the more are the projections compresed, so that the friction area, and thus the automatic locking against shaking loose, is progressively increased. This effect is reinforced by the elasticity of the projections, which consist of the same elastic material as the rest of the coating. Variations in temperature and the resulting contraction or expansion of the coating are compensated for by the elastic compliance of the projections. If the deformable material of the thread protector is arranged in a hollow steel body it can only expand in about the same way as a steel thread to be protected, whereby the extent of contraction of the coating is kept to a minimum at the places where it is thinnest.

Particularly in the case of tapered threads the projections are preferably arranged in the root of the threads in the coating. This enables the thread protector to be pushed initially over a few turns of the thread before screwing-on is begun. In addition less grease is stripped off from the crest of the threads to be protected.

Good centering of the threads relative to one another is ensured by projections on the flanks of the threads: this considerably reduces the displacement of the grease on the flanks of the threads.

In the case of the thread protector according to the invention, ovalities of the thread to be protected do not have a locking effect on screwing on—what is otherwise typical is a jerky screwing up—nor is there unintentional relaxation of the automatic locking on vibration, since the projections exhibit high elasticity. This effect is of particular interest in the case of tapered API (American Petroleum Institute) threads, with which a small unscrewing moment is frequently sufficient to loosen or strip off the thread protector.

If necessary, in the case of tapered threads the projections can increase in height as the screw length increases. As the volume of the elastic projections to be compressed increases, the screwing-up force required becomes progressively greater, and so of course does the automatic locking against loosening. Here it is possible either to increase the height of the projections linearly more than the thread taper or to use stepped projections. A projection on and around the end sealing face of the thread protector also contributes to good sealing of the thread. Such a sealing lip also acts as a spring washer under a nut. If a minimal amount of thread grease is used there is no capillary effect in the thread for corrosive aqueous media.

The remaining small gap in the root of the thread is filled with grease, while the projections, squashed to ninety percent of their volume, cover the crests and flanks (as the case may be) of the threads.

The projections according to the invention are also suitable for a thread protector of plastic without stiff metallic inclusions. With respect to the height of the projections, the greater amount of contraction and expansion must however be taken into account.

The invention will now be explained in more detail with reference to several exemplary embodiments shown in the drawings. In the drawings:

FIG. 2 shows a thread protector according to the invention, partially screwed on to a saw-tooth shaped tube thread;

FIG. 3 shows the thread protector according to the invention according to FIG. 2, almost completely screwed on to the tube thread.

FIG. 4 shows a thread protector according to the invention with different kinds of projections;

FIG. 5 shows a thread protector according to the invention for round threads;

All the drawings show ends of oilfield tubes with API (American Petroleum Institute) tapered external threads, provided with a thread protector in the form of a protective cap.

Figure 1:
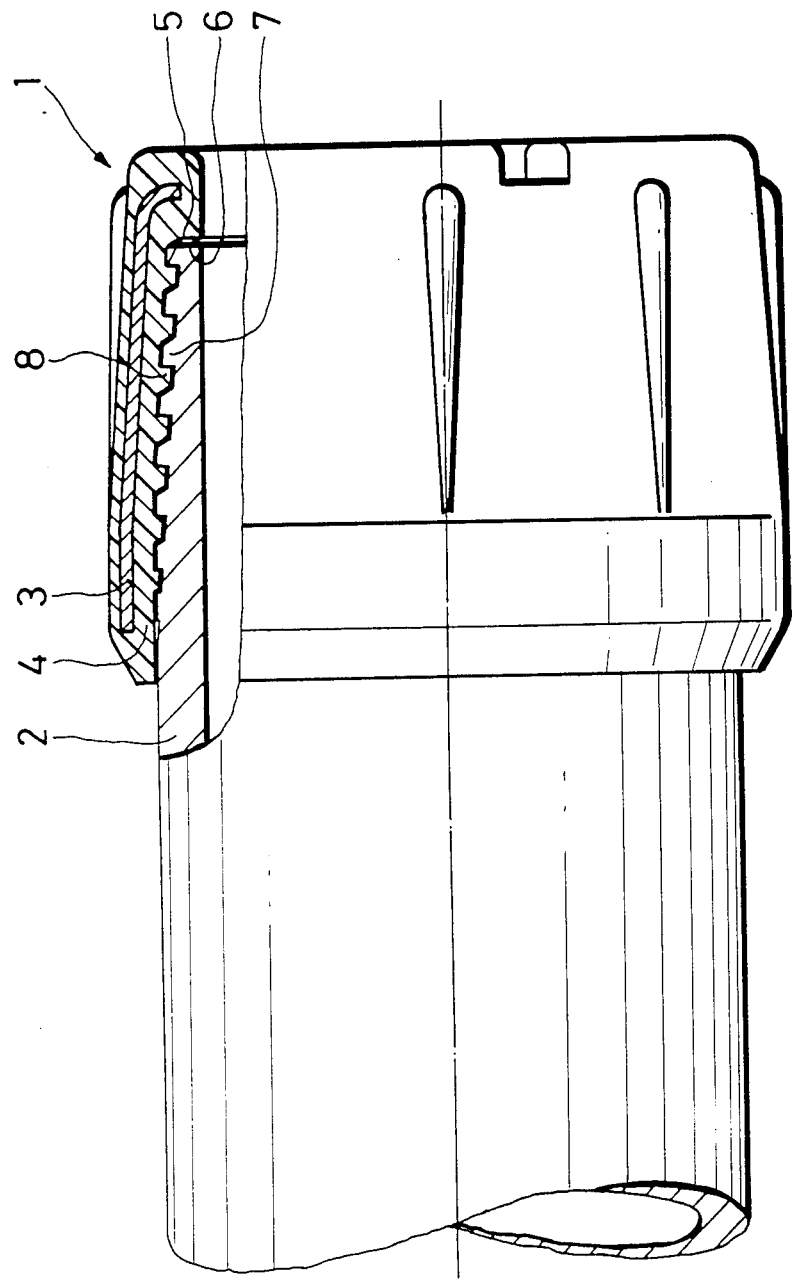
FIG. 1 shows, partly in section, a conventional steel-plastic thread protector with the associated tube thread.

FIG. 1 shows an oilfield tube with a saw-tooth thread 7 and an end face 6, on to which a conventional thread protector 1 is screwed. The end sealing face 5 of the thread protector 1 does not abut against the end face 6 of the oilfield tube 2, either because the friction on screwing up between the thread 8 in a coating 4 of the thread protector 1 stabilised by a stiff hollow body 3 and the oilfield tube 7 was too great, or because the oilfield tube 2 is oval. Water can penetrate into the air gap.

FIG. 2 shows a thread protector 13 according to the invention having at the root of the thread 8 of the shock-absorbing coating 4 of polyurethane a projection 10 running as a continuous rib helically through the thread 8. The sealing surface 5 is provided with an annular projection 9. On screwing the protective cap 13 on to the thread 7 of the oilfield tube 2 the cap only contacts the oilfield tube 2 with the tips of the projection 10 and the steep flanks of the thread 8.

FIG. 3 shows the same protective cap 13 in a situation where it has been almost completely screwed on. The projection 9 on the sealing surface 5, in the form of a sealing lip, is already partly deformed by pressing and seals the connection or the thread 7 of the oilfield tube 2 to the end face 6. The projections 10 of the thread 8 of the polyurethane coating 4, which is brought to a Shore hardness of A 90, are almost completely flattened out. This results in a heavy pressure—represented by curved lines—in the coating 8 between the crests of the thread 7 and the stiff hollow body 3. This compression of the elastic material with great ability to recover its shape ensures good automatic locking of the thread protector against loosening.

FIG. 4 shows a thread protector 14, the coating 4 of which carries a thread 8 that is complementary to the thread 7 to be protected in the oilfield tube 2 and that exhibits both projections 10 and also centering projections 11 on the flanks of the thread. In this version the screwing up moment is still smaller and the amout of grease displaced is at a minimum.

FIG. 5 shows the end of an oilfield tube 19 having round threads 23, onto which is screwed a thread protector 15 with complementary threads 18. In the case of this thread 18 only centering projections 12 are arranged on the flanks of the thread, since projections in the root of the thread would not allow stable guidance of the thread protector 15.

Figure 6:
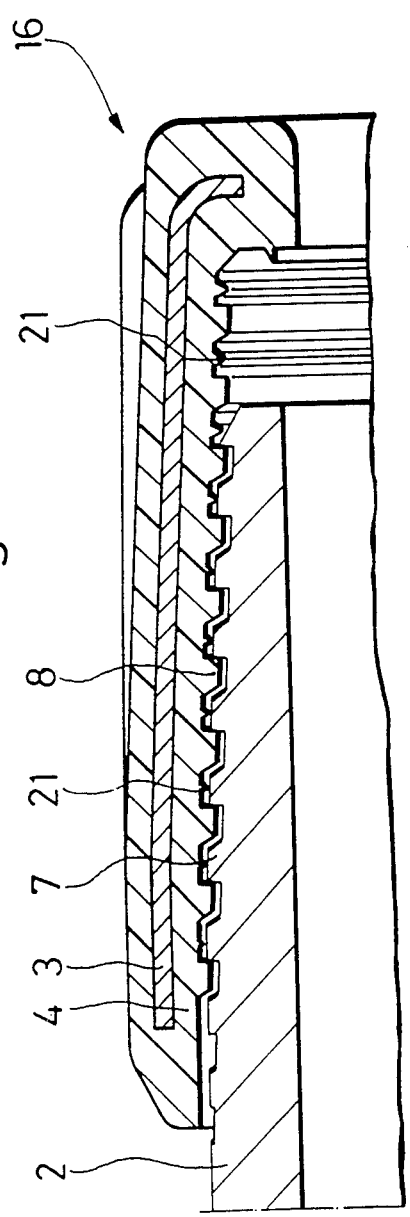
FIG. 6 shows a thread protector according to the invention with projections of progressively increasing heights.
Figure 7:
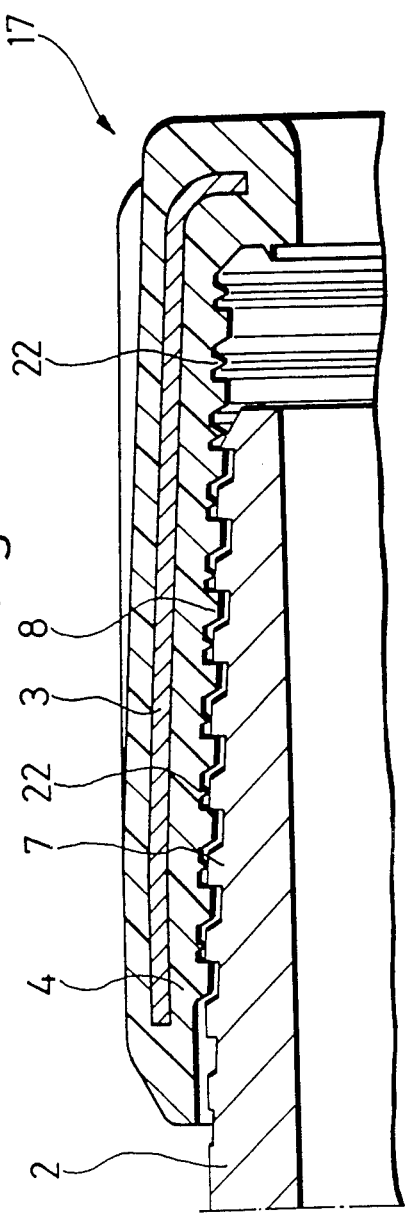
FIG. 7 shows a thread protector according to the invention with projections, the height of which increases discontinuously.

FIG. 6 shows a thread protector 16 similar to FIG. 2 but having projections 21 in the thread 8 of the coating 4 that become continuously higher from the beginning to the end of the thread, so that in the fully screwed-on position the pressure along the projections 21 progressively increases. Tests with the thread protector 17 of FIG. 7, in which the height of the projections 22 increases sharply after every third turn of the thread 8, have shown similar results.

The invention is not limited to the exemplary embodiments shown; in particular the projections can be formed as "sharks' teeth" or be moulded on at an acute angle to the radial direction, and in the case of very large thread teeth two projections can be arranged in each thread root.

I claim:

1. A thread protector for screw threads, wherein the improvement comprises a protective cap (13, 14, 15, 16, 17) arranged to be threaded onto an external thread on one end of a pipe for laterally enclosing and protecting the thread on the end of the pipe, said protective cap having a thread (8, 15) complementary to the thread to be protected, said thread including an elastically deformable projection (10, 11, 12, 21, 22) formed on and projecting from the thread and located on at least one pitch of the thread for deformably contacting the thread to be protected.

2. A thread protector according to claim 1, wherein each pitch of the thread exhibits a projection (10, 11, 12, 21, 22).

3. A thread protector according to claim 2, wherein the projections (10, 11, 12, 21, 22) are formed on the thread (8) as ribs running continuously along it.

4. A thread protector according to claim 2, wherein the projections (10, 21, 22) are arranged in a root of the thread.

5. A thread protector according to claim 2, wherein the projections (11, 12) are arranged on flanks of the thread.

6. A thread protector according to claim 2, wherein the height of the projections (21, 22) increases from the beginning to the end of the threads.

7. A thread protector according to claim 2, wherein in addition a sealing face (5) on the end of the thread protector is provided with a projection (9) running round it.

8. A thread protector for an externally threaded end of a pipe comprising a protective cap having a central axis and arranged to be placed on the externally threaded end of the pipe, comprising an annular wall extending in the axial direction of the central axis and having a first end and a second end, an end section located on the first end of said wall and extending transversely of the central axis, said wall and said end section being formed of a deformable plastic material, said wall having an inside surface with a thread cut in the inside surface with said thread being complementary to the threaded end of the pipe to be protected, said thread having a plurality of turns and each turn having opposite flanks and a root between said flanks on adjacent turns, and a projection extending from at least one of said turns of said thread and arranged to be deformed by contact with the threaded end of the pipe to be protected.

9. A thread protector, as set forth in claim 8, including a stiff hollow body embedded within said annular wall and spaced radially outwardly from said inner surface of said annular wall and extending from adjacent the first end of said annular wall to adjacent the second end thereof.

10. A thread protector, as set forth in claim 9, wherein said deformable plastic material comprises polyurethane.

11. A thread protector, as set forth in claim 10, wherein said thread formed by said polyurethane has a Shore hardness of A 90.

12. A thread protector, as set forth in claim 10, wherein said projection is formed on each of the turns of said thread.

13. A thread protector, as set forth in claim 12, wherein said projections are formed as a continuous rib on said thread extending from adjacent the first end of said annular wall to adjacent the second end of said annular wall.

14. A thread protector, as set forth in claim 10, wherein said projections are formed in the root of the thread and extend continuously from adjacent the first end to adjacent the second end of said annular wall.

15. A thread protector, as set forth in claim 10, wherein said projections are formed on the opposite flank of each turn of said thread.

16. A thread protector, as set forth in claim 10, wherein said projections are formed in the root of said thread and extend radially inwardly from said root.

17. A thread protector, as set forth in claim 10, wherein said end section is annular and projects inwardly from said annular wall so that it extends over the threaded end of the pipe to be protected, said end section having a sealing face arranged to be directed toward the threaded end of the pipe to be protected, and a projection encircling said sealing face and arranged to engage an end face on the threaded end of said pipe to be protected.

18. A thread protector, as set forth in claim 10, wherein said stiff hollow body is formed of metal.

* * * * *